United States Patent
Watanabe et al.

(10) Patent No.: US 6,316,146 B1
(45) Date of Patent: Nov. 13, 2001

(54) CARBON MATERIALS FOR NEGATIVE ELECTRODE OF SECONDARY BATTERY AND MANUFACTURING PROCESS

(75) Inventors: Kazuhiro Watanabe; Norishige Nanai, both of Kanagawa; Katsuhiro Nichogi, Tokyo; Akihito Miyamoto; Soji Tsuchiya, both of Kanagawa, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/227,807

(22) Filed: Jan. 11, 1999

(30) Foreign Application Priority Data

Jan. 9, 1998 (JP) .................................................. 10-003008
Jan. 9, 1998 (JP) .................................................. 10-003009
Oct. 27, 1998 (JP) .................................................. 10-304864

(51) Int. Cl.[7] ....................................................... H01M 4/58
(52) U.S. Cl. ........................ 429/231.8; 252/502; 423/414
(58) Field of Search ........................... 429/231.8, 231.95; 252/502; 423/414

(56) References Cited

U.S. PATENT DOCUMENTS

| | | | | |
|---|---|---|---|---|
| 5,451,477 | * | 9/1995 | Omaru et al. | 429/210 |
| 5,851,697 | * | 12/1998 | Iijima et al. | 429/218 |

FOREIGN PATENT DOCUMENTS

| | | |
|---|---|---|
| 60-182670 | 9/1985 | (JP) . |
| 61-111907 | 5/1986 | (JP) . |
| 62-90863 | 4/1987 | (JP) . |
| 4-155776 | 5/1992 | (JP) . |
| 07296814 | 11/1995 | (JP) . |
| 09283142 | 10/1997 | (JP) . |
| 09320595 | 12/1997 | (JP) . |
| 10152311 | 6/1998 | (JP) . |

* cited by examiner

Primary Examiner—Gabrielle Brouillette
Assistant Examiner—M. Wills
(74) Attorney, Agent, or Firm—Ratner & Prestia (57) ABSTRACT

A carbon material for negative electrode of a secondary battery, in particular lithium-ion secondary battery, is prepared by pyrolysis in an inert gas atmosphere or in a vacuum of a composite resin obtained by dissolving pitch in a pitch-soluble resin such as a nobolac phenol resin as it is, or a resin solidified by curing treatment in a state in which the above composite resin is dispersed in a resin solidified by curing treatment or in an uncured resin having a phenol hydroxyl radical such as resol type phenol resin, followed by pulverization in an inert gas, and further heat treatment in an inert gas atmosphere or in a vacuum. Also, a negative electrode material with which irreversible capacity is small, initial discharge capacity is large, and capacity decrease due to cycles is small can be provided by pyrolyzing in an inert gas atmosphere or in a vacuum powder of a resin such as a resol type phenol resin the primary chain of which containing an aromatic compound, or pyrolyzing in an inert gas atmosphere or in a vacuum in a first step, followed by heat treatment in a vacuum in a second step. By employing these negative electrode materials, it is possible to achieve a higher capacity in lithium-ion secondary batteries.

38 Claims, 4 Drawing Sheets

CARBON MATERIALS FOR NEGATIVE ELECTRODE OF SECONDARY BATTERY AND MANUFACTURING PROCESS

FIELD OF THE INVENTION

The present invention relates to carbon materials for negative electrode of secondary batteries that use lithium (Li) as the active material and their manufacturing process, and aims at improving the capacity of lithium secondary batteries.

BACKGROUND OF THE INVENTION

Lithium batteries which employ Li as the negative active material can constitute high-voltage battery systems by combining with an appropriate positive active material, and the energy density, especially weight efficiency (Wh/kg), can be improved. For this reason, various types of lithium batteries are put into practical use in a large volume as small, light-weight power sources for portable equipment.

In addition to lithium primary batteries which need to be replaced after end of discharge, lithium secondary batteries which can be renewed for continued use have been developed and are becoming commercially practical.

Since metallic Li reacts with water generating hydrogen, non-aqueous electrolyte such as liquid organic electrolyte obtained by dissolving a certain kind of Li salt into a dehydrated aprotic organic solvent or solid polymer electrolyte is generally used as the electrolyte in lithium batteries.

If metallic Li can be used as it is as a negative electrode material for a secondary battery as in a primary battery, the negative electrode potential becomes the least noble making it possible to construct a high-voltage battery system and providing advantage from the standpoint of energy density. However, metallic Li negative electrode suffers the problem of causing active dendritic or mossy crystals of metallic Li to deposit on the negative electrode surface during charge, which penetrate the separator and tend to cause internal short circuit with the positive electrode, thus making it unable to achieve a long cycle life.

Furthermore, the deposited dendritic or mossy crystals of metallic Li react with the solvent in the organic electrolyte making it inactive, thus making the battery unrenewable by charge and resulting in a relative decrease of the capacity. It was therefore necessary in designing and manufacturing batteries to load a large quantity of the negative active material in anticipation of such a decrease of capacity, indicating that it is not necessarily a good negative electrode material appropriate for realizing a high capacity.

In order to suppress such deposition of dendritic or mossy crystals during charge, alloys of Li with aluminum or with Wood's metal which is a fusible alloy have been tried as a negative electrode material. A negative electrode comprising such metals as can make alloys with Li or Li alloys containing at least one of such metals shows a relatively high capacity in the initial cycles of charge-discharge. However, through repetition of alloying with Li due to charge and detachment of Li due to discharge, a phase different from the original one is caused though keeping the original crystal structure of the skeleton alloy, or a change into a crystal structure which is different from the original skeleton alloy tended to be caused.

Through such a phenomenon, crystal grains of the metal of the alloy acting as the host material of Li active material undergo swelling and shrinking, and as the charge-discharge cycles the progresses, cracks take place in the crystal grains of the metal or alloy as the host material resulting in the grains becoming fine. Such phenomenon of the grains becoming fine causes an increase in the ohmic resistance among grains of the negative electrode material, and deterioration of the charge-discharge characteristic due to an increase in the resistance polarization during charge and discharge. Consequently, the use of a negative electrode material comprising a Li alloy is currently limited to the negative electrode material for lithium secondary batteries for applications such as memory backup which is not always subjected to a deep discharge.

On the other hand, a system in which a carbon material such as graphite capable of repeating absorption and desorption of lithium ions ($Li^+$) with charge and discharge is employed as the host material in the negative electrode material has been recently commercialized under the name of lithium-ion secondary batteries. As the positive electrode material, lithium cobaltate ($LiCoO_2$), lithium nickelate ($LiNiO_2$), or spinel-type lithium manganese oxide ($LiMn_2O_4$), which are all capable of repeating desorption and absorption of lithium ions ($Li^+$) with charge and discharge, are used similarly to the negative electrode. As the lithium-ion secondary batteries have a long cycle life, increasingly more of them are being used in small and light weight power sources for portable telephones, camcorders, and notebook type personal computers.

The capacity (mAh) and energy density ($mWh \cdot g^{-1}$) of lithium-ion secondary batteries have a close interrelationship primarily with the capacity density ($mAh \cdot g^{-1}$) of the carbon material used as the host material of $Li^+$ of the negative electrode. As is well known, carbon has a wide range of forms from crystalline graphite to amorphous carbon and its characteristic as a negative electrode material is heavily dependent on its physical properties.

As an example, use in a negative electrode of graphitic carbon material made from a material generally referred to as graphitizable carbon or soft carbon is disclosed in Japanese Laid-Open Patent No. Sho 60-182670 and Japanese Laid-Open Patent No. Hei 4-155776. When using graphite, the theoretical capacity of its carbon material is calculated to be 372 $mAh \cdot g^{-1}$ from Eqn. (1).

(1)

When using a graphite group carbon material in the negative electrode, a capacity close to the theoretical capacity is obtained and, as the charge-discharge potential is approximately equal to the dissolution and deposition potential of metallic Li and is extremely flat, a lithium-ion battery having a high capacity and with a stable voltage can be realized. However, graphite group material with a high degree of crystallization has a drawback of decomposing organic solvent of the liquid electrolyte.

In contrast to this, use of an amorphous or low-crystallization carbon material generally referred to as non-graphitizable carbon or hard carbon in the negative electrode is disclosed in Japanese Laid-Open Patent No. Sho 61-111907 and Japanese Laid-Open Patent No. Sho 62-90863. In these cases, though the flatness of the discharge voltage as a lithium-ion secondary battery is inferior, it has the features of suppressing decomposition of organic solvent of the electrolyte and at the same time achieving a high capacity in excess of the theoretical capacity of graphite or graphitic carbon materials of 372 mAh·g$^{-1}$.

In order to achieve a high capacity of a carbon material for negative electrode in a lithium-ion secondary battery, it is necessary that a large quantity of Li be absorbed by insertion into the carbon material in the initial charge and that a large discharge capacity be taken out in the initial discharge. Usually, however, the above-mentioned initial discharge capacity is smaller than the initial charge capacity with some inactive irreversible capacity existing due to dead lithium absorbed and fixed within the carbon material without contributing to subsequent discharge. Though conventional soft carbon is suitable for achieving a higher capacity, it also suffers a serious drawback of having a large irreversible capacity. Lithium-ion secondary batteries suffer a problem of the liquid organic electrolyte being decomposed or internal short-circuit caused when subjected to over charge. The greater the irreversible capacity of the carbon material of the negative electrode is, the more tho positive electrode is over charged and decomposes liquid organic electrolyte. Accordingly, when constructing a battery, it is necessary to increase the positive electrode capacity in the amount equal to the irreversible capacity of the negative electrode in order to suppress over charge. This increment of the positive electrode capacity equal to the irreversible capacity of the negative electrode is an inefficient portion which cannot contribute to subsequent discharge and is a limiting factor in achieving a higher capacity.

Consequently, it is an extremely significant requirement that the negative electrode material to obtain a high-capacity lithium-ion secondary battery should have a characteristic of absorbing a large quantity of lithium in the initial charge while having a small irreversible capacity.

SUMMARY OF THE INVENTION

The present invention relates to carbon materials for negative electrode having a large quantity of lithium absorption in the initial charge and a small irreversible capacity and their manufacturing process, and aims at providing lithium-ion secondary batteries with a long cycle life and a high capacity by using these carbon materials for negative electrode.

A first exemplary embodiment of the present invention uses as the starting materials a composite resin prepared by dissolving pitch in a pitch-soluble resin as it is or after curing treatment, and a composite resin added to a resin having an uncured phenol hydroxyl radical and cured. After pyrolysis of these starting materials (carbonization, first heat treatment), the pyrolysis product is pulverized and heat treated at a predetermined temperature (second heat treatment) to obtain a carbon material for negative electrode of a secondary battery in which the inside of the powder is of an amorphous structure and a stratiform construction has been formed on at least part of the surface nearly in parallel to the surface.

A second exemplary embodiment of the present invention is an amorphous carbon material for negative electrode of a secondary battery obtained by pyrolyzing (carbonization) in an inert gas atmosphere or in a vacuum resin powder the primary chain of which containing an aromatic compound, or subsequently further heat treating in a vacuum after pyrolysis.

DETAILED DESCRIPTION OF THE PREFERRED EMBODIMENTS

Referring now to the drawings and tables, description in detail of the present invention is made with regard to exemplary embodiments and examples.

First Exemplary Embodiment

EXAMPLE 1

A composite resin is prepared by thermally fusing a novolac phenol resin as pitch-soluble resin, into which pulverized petroleum pitch is added and dissolved by stirring while keeping at 130° C. The added quantity of the petroleum pitch is 10 parts by weight to 100 parts by weight of the novolac phenol resin.

From a thermogravimetric analysis by a thermal balance of the obtained composite resin, it was confirmed that the starting temperature of pyrolysis was 370° C. and the ending temperature of pyrolysis was 600° C. Here, the starting temperature of pyrolysis is the temperature at which the weight starts to suddenly decrease due to pyrolysis during the thermogravimetric analysis, while the ending temperature of pyrolysis is the temperature at which no more decrease of weight due to pyrolysis is observed.

The composite resin thus prepared is heated at a temperature rise rate of 5° C.·min$^{-1}$ to 500° C. in a nitrogen gas flow and kept at the temperature for 1 hour for pyrolysis. The pyrolysis product is pulverized by a planetary ball mill in a nitrogen atmosphere to an average particle size of 10 μm.

The obtained powders are heated in a nitrogen gas flow to 1000° C. at a temperature rise rate of 5° C.·min$^{-1}$, and are heat treated by keeping at the temperature for 1 hour to obtain carbon powders (Sample No. 1-1).

On the other hand, using a novolac phenol resin alone in which no petroleum pitch is dissolved as the starting material, carbon powder for comparison (Sample No. 1-2) is obtained under otherwise exactly the same conditions.

Figure 1:
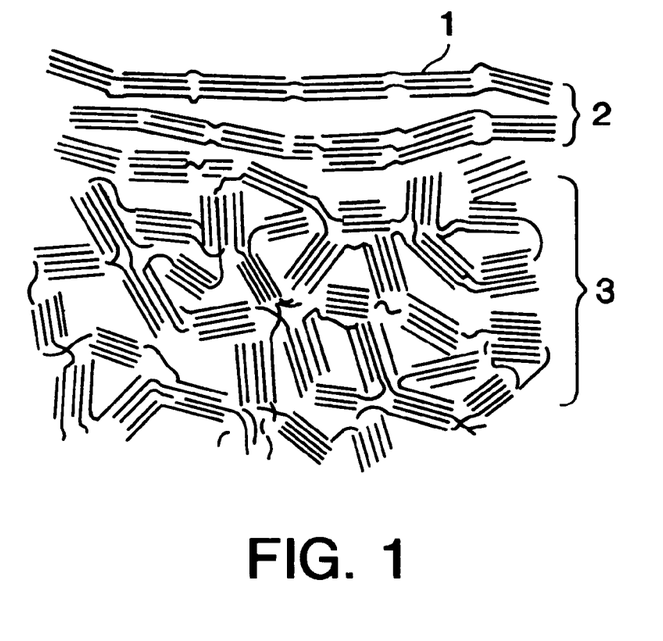
FIG. 1 is an enlarged schematic structural diagram of powder of a carbon material for negative electrode of a lithium secondary battery in Example 1 in accordance with the first exemplary embodiment of the present invention.

FIG. 1 shows a enlarged schematic structure observed by a transmission electron microscope of the carbon powder (Sample No. 1-1) based a composite resin as the starting material. In FIG. 1, a stratiform structure 2 nearly in parallel to the powder surface is observed in the region 30 nm from the carbon powder surface 1. Furthermore, it was observed that inside of the carbon powder was of an amorphous structure in which the c axes were random with respect to the carbon powder surface. The average lattice distance of the (002) plane of the portion of the stratiform structure 2 was confirmed to be 0.37 nm while the average lattice distance of the (002) plane of the portion of the amorphous structure 3 was confirmed to be 0.40 nm. In contrast, the Sample No. 1-2 based on the starting material of the nobolac phenol resin alone showed an amorphous structure in a transmission electron microscope observation and no stratiform structure nearly in parallel to the powder surface was observed on the powder surface unlike the Sample No. 1-1.

Figure 2:
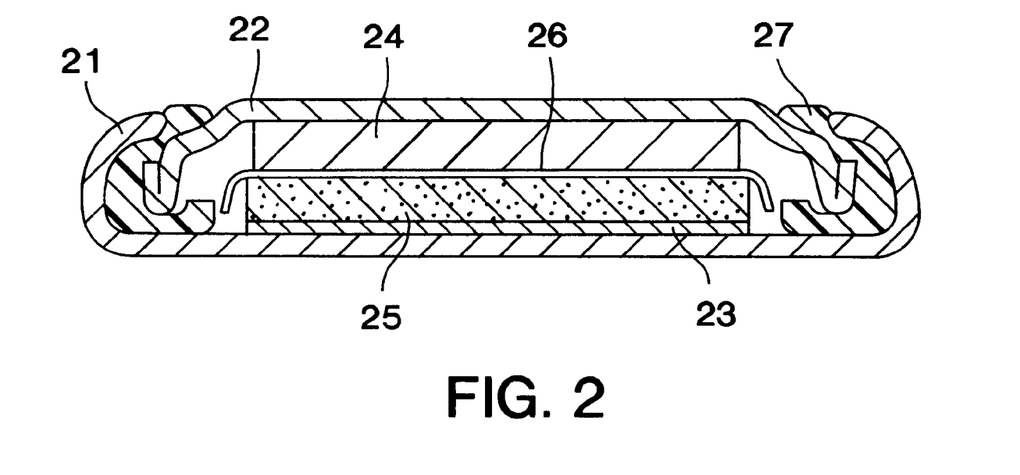
FIG. 2 is a cross sectional view of a coin type test cell for evaluation of the carbon material for negative electrode of a lithium secondary battery in Example 1 of the first exemplary embodiment of the present invention.

Using Samples No. 1-1 and 1-2, carbon electrodes were made by preparing paste by adding to 3 grams each of the carbon powders 3 grams of a solution dissolving polyvinylidene fluoride in N-methyl pyrrolidone by 10 wt % and blending, and coating the paste on one side of copper foil having a thickness of 20 μm and drying. Ten each of coin type test cells for evaluation of the carbon materials were made by using these carbon electrodes. FIG. 2 shows a cross sectional view of the coin type test cell. In FIG. 2, a cell case 21 made of stainless steel sheet and a cover 22 are sealed in a liquid- and gas-tight manner via a gasket 27 made of polypropylene. A carbon electrode 25 is formed on copper foil 23. A disk-shaped metallic Li electrode 24 is pressed under pressure inside the cover 22. The carbon electrode 25 and the metallic Li electrode 24 are separated by a separator 26 made of a microporous polypropylene membrane. A liquid organic electrolyte is impregnated and fixed in between the electrodes, and in the carbon electrode 25 and the separator 26. The liquid organic electrolyte used was prepared by dissolving lithium hexafluorophosphate (LiPF$_6$), a solute being an electrolyte, into an equal-volume mixed solvent of ethylene carbonate (EC) and diethyl carbonate (DEC) to 1 mol·l$^{-1}$ concentration.

These test cells may be understood to be of a structure in which the manganese dioxide (MnO$_2$) positive electrode of a general coin type lithium primary battery, for instance lithium-manganese dioxide cell, has been replaced with a carbon electrode.

The test cells were subjected to an initial charge by passing a constant current of 0.2 mA at 20° C. until the cell voltage reached 0 V and keeping the constant voltage of 0 V for 20 hours.

Subsequently, the initial discharge capacity was measured by discharging at the same constant current of 0.2 mA and temperature of 20° C. as the initial charge until the voltage reached 1.5 V, and the irreversible capacity was calculated by subtracting the initial discharge capacity from the initial charge capacity. Table 1 shows average values of the initial discharge capacity and the irreversible capacity of 10 each cells.

TABLE 1

| Sample No. | Initial Disc. Cap. (mAh · g$^{-1}$) | Irrev. Cap. (mAh · g$^{-1}$) |
|---|---|---|
| 1-1 | 420 | 80 |
| 1-2 | 320 | 240 |

While the irreversible capacity of the sample for comparison comprising an amorphous carbon was extraordinarily large though the initial discharge capacity was nearly same as graphite, the Sample No. 1-1 based on the starting material of a composite resin showed a small irreversible capacity of approximately ⅓ of the Sample No. 1-2 and a large initial discharge capacity indicating that it has a practically sufficient characteristic as a carbon material for negative electrodes of lithium ion secondary batteries.

EXAMPLE 2

Carbon powder (Sample No. 1-3) was obtained by using as the starting material a composite resin prepared by replacing the novolac phenol resin of Example 1 with a high ortho type novolac phenol resin, and dissolving petroleum pitch into the novolac phenol resin as in Example 1, and by pyrolyzing, pulverizing, and heat treating under the same conditions as in Example 1.

Characteristic of the carbon powder of Sample No. 1-3 as a carbon material for negative electrode was studied by a transmission electron microscope observation and by making coin type test cells as in Example 1. As a result, an average initial discharge capacity of 450 mAh·g$^{-1}$ and average irreversible capacity of 100 mAh·g$^{-1}$ were obtained, showing that the carbon material has a practical value as an electrode material just as the Sample No. 1-1, and the inside of the powder was found to be amorphous in structure with a stratiform structure formed on at least part of the powder surface nearly in parallel to the surface.

EXAMPLE 3

Figure 3:
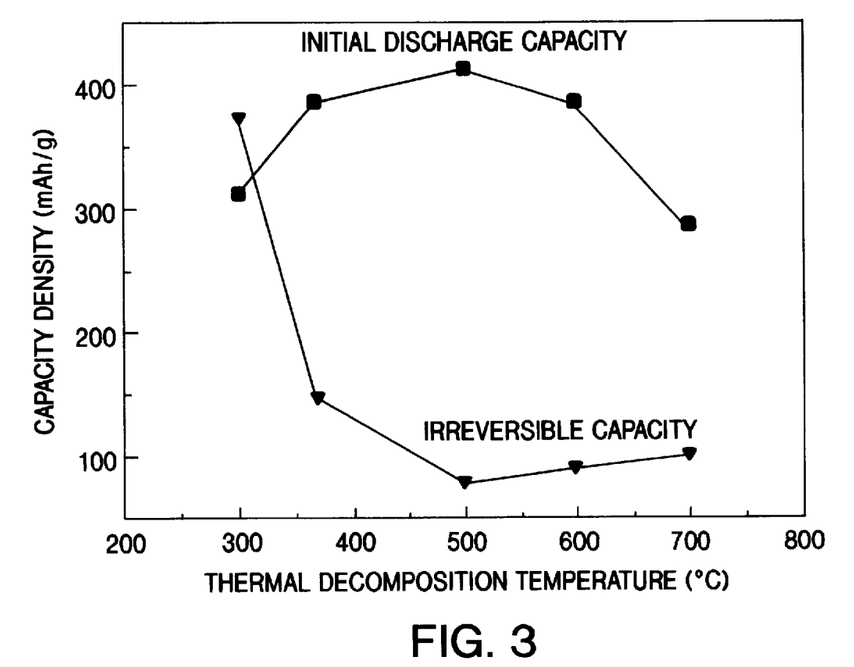
FIG. 3 is a graph showing relationship between the temperature of pyrolysis and the initial discharge capacity and irreversible capacity of the obtained carbon material for negative electrode in Example 3 of the first exemplary embodiment of the present invention.

Using the same composite resin as in Example 1 as the starting material, and with the same temperature-rise rate during the pyrolysis process of 5° C.·min$^{-1}$, carbon powders were prepared at pyrolysis temperatures of 300° C., 370° C., 500° C., 600° C., and 700° C., at which the materials are kept for 1 hour, with other conditions exactly the same as in Example 1. Subsequently, using these carbon powders, coin type cells were made in the same manner as in Example 1, and their characteristic as a carbon material for an electrode was studied. FIG. 3 shows the change of the initial discharge capacity and the irreversible capacity as a function of the pyrolysis temperature.

It is seen from FIG. 3 that by pulverizing within the temperature range between a pyrolysis starting temperature of 370° C. or higher and a pyrolysis ending temperature of 660° C. or lower, a relatively small irreversible capacity and a large initial discharge capacity can be obtained providing carbon materials that are effective for negative electrode of lithium ion secondary batteries. It was also confirmed by a transmission electron microscope observation that all of these effective carbon materials had in the inside an amorphous structure and stratiform structure formed on at least part of the powder surface nearly in parallel to the surface similarly to Sample No. 1-1.

EXAMPLE 4

Carbon powders were prepared by changing the quantity of petroleum pitch to be added and dissolved, in making composite resins, in 100 parts by weight of nobolac phenol resin from 0.5 to 1, 10, 20, 40, 50, and 60 parts by weight, with other conditions the same as in Example 1. Using these carbon powders, coin type test cells were made in the same manner as in Example 1, and the initial discharge capacity and irreversible capacity were obtained from the initial charge and initial discharge.

Figure 4:
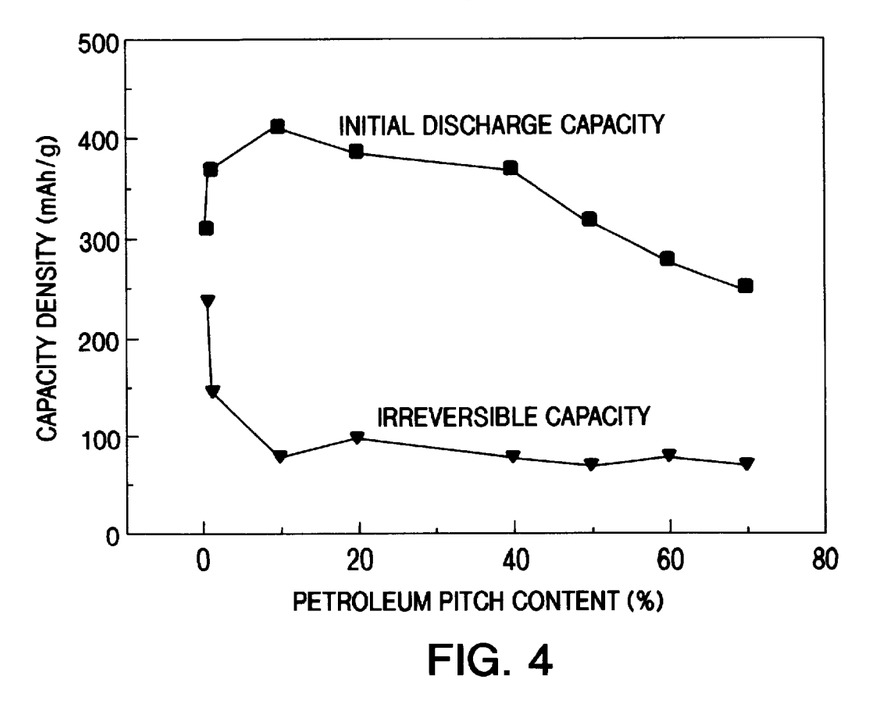
FIG. 4 is a graph showing relationship between the percentage of pitch content in the composite resin and the initial discharge capacity and irreversible capacity of the obtained carbon material for negative electrode in Example 4 of the first exemplary embodiment of the present invention.

FIG. 4 shows the results obtained. It is seen from FIG. 4 that by increasing the added quantity of the petroleum pitch to at least 1 part by weight or greater, the irreversible capacity decreases, and that within the range of 1 to 50 parts by weight of the petroleum pitch, carbon materials for negative electrode of lithium ion secondary batteries with a practically sufficient characteristic can be obtained.

Figure 5:
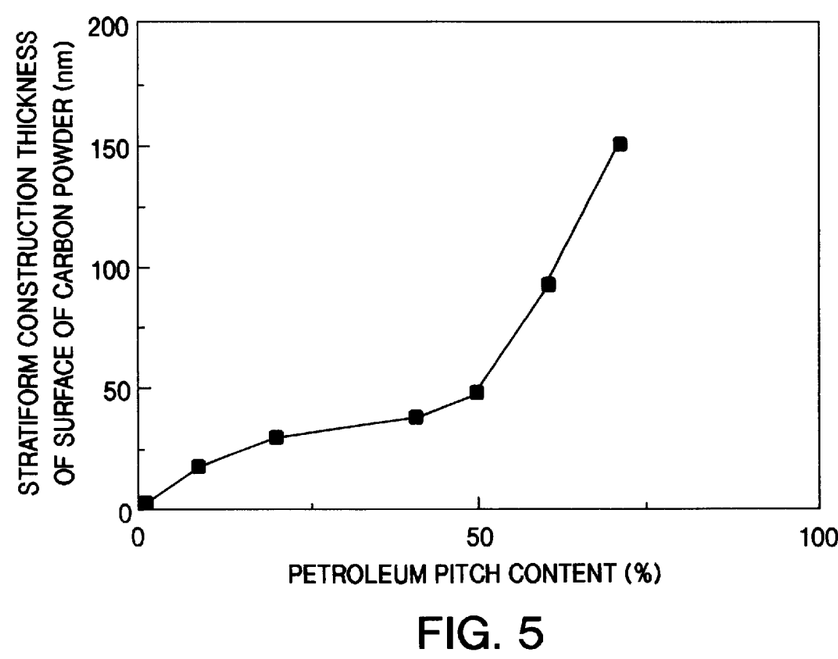
FIG. 5 is a graph showing relationship between the percentage of pitch content of the composite resin and the thickness of the stratiform structure of the surface of carbon powder for negative electrode in Example 4 of the first exemplary embodiment of the present invention.

Also, from a transmission electron microscope observation, it was found that inside of each of the powder of carbon materials added with the petroleum pitch in a range 1 to 50 parts by weight had a random amorphous structure as in the Sample No. 1-1 of Example 1 and that a stratiform structure had been formed on at least part of the powder surface nearly in parallel to the surface. FIG. 5 shows the relationship between the added quantity of the petroleum pitch and the thickness of the stratiform structure of the surface of the obtained carbon powder. It can be seen from FIG. 5 that the thickness of the stratiform structure of the powder surface of the carbon materials within the range of added quantity of the petroleum pitch from 1 to 50 parts by weight was all 50 nm or smaller.

It was also confirmed that the average lattice distance of the (002) plane in these stratiform structures was within the range 0.335 nm to 0.38 nm.

As a carbon material for negative electrode of lithium ion secondary batteries, it can be seen from FIG. 4 and FIG. 5 that it is preferable that the carbon powders have physical characteristic of being amorphous in structure in the inside, having a stratiform structure formed on at least part of the surface nearly in parallel to the surface, the thickness of the stratiform structure being 50 nm or smaller, and having an average lattice distance of the (002) plane of the stratiform structure in the range 0.335 to 0.38 nm.

EXAMPLE 5

Carbon powder was prepared by adding 13 wt % of hexamethylene tetramine to the same composite resin as in Example 1, solidifying the composite resin by curing the novolac phenol resin within the composite resin by heating to 180° C., followed by pyrolysis, pulverization, and heat treatment under the same conditions as in Example 1.

Using the obtained carbon powders, coin type test cells were made in the same manner as in Example 1, the initial discharge capacity and irreversible capacity were obtained, and a transmission electron microscope observation was made.

It was confirmed that, as the average initial discharge capacity and the average irreversible capacity were 510 mAh·g$^{-1}$ and 90 mAh·g$^{-1}$, respectively, the carbon powders have a characteristic effective as a carbon material for negative electrode of lithium ion secondary batteries. It was also confirmed by a transmission electron microscope observation that the powder structure was similar to that of Sample No. 1-1.

EXAMPLE 6

Using the same composite resin as in Example 1 as the starting material, carbon powders were prepared by carrying out pyrolysis and pulverization under the same conditions as in Example 1, and heating the pyrolysis product powders to 600° C., 700° C., 800° C., 1000° C., 1200° C., 1500° C., and 1800° C. in a nitrogen gas flow at a temperature rise rate of 5° C.·min$^{-1}$, followed by heat treatment by keeping each sample for 1 hour at each respective temperatures.

Using each of these carbon powders, coin type test cells were made in the same manner as in Example 1, and the characteristic as a carbon material for negative electrode was studied and a transmission electron microscope observation made.

Figure 6:
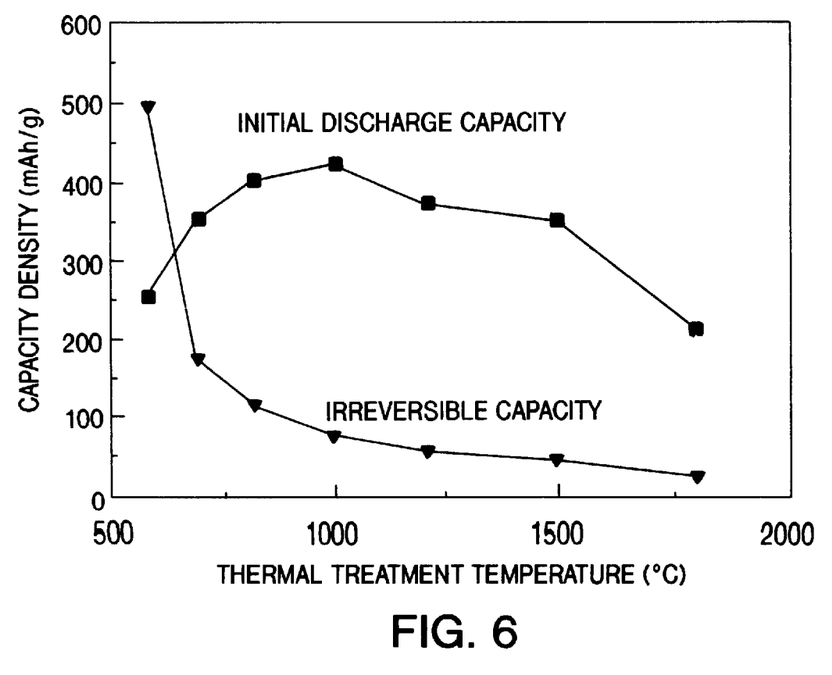
FIG. 6 is a graph showing relationship between the temperature of heat treatment and the initial discharge capacity and irreversible capacity of the obtained carbon material for negative electrode in Example 6 of the first exemplary embodiment of the present invention.

FIG. 6 shows the initial discharge capacity and the irreversible capacity as a function of the heat treatment temperature. It is seen from FIG. 6 that, by heat treatment in the temperature range 700° C. to 1500° C., an average initial discharge capacity of at least 350 mAh·g$^{-1}$ and an average irreversible capacity of 180 mAh·g$^{-1}$ or less are obtained suggesting that the material is appropriate as a carbon material for negative electrode of a lithium ion secondary battery. Also, all of these carbon powders have an amorphous structure inside the powder similar to Sample No. 1-1 of Example 1 and have a stratiform structure formed on at least part of the powder surface nearly in parallel to the surface. The thickness of the stratiform structure of the powder surface is 35 nm and the average lattice distance of the (002) plane of that section is 0.37 nm, with almost no change depending on the heat treatment temperature.

Figure 7:
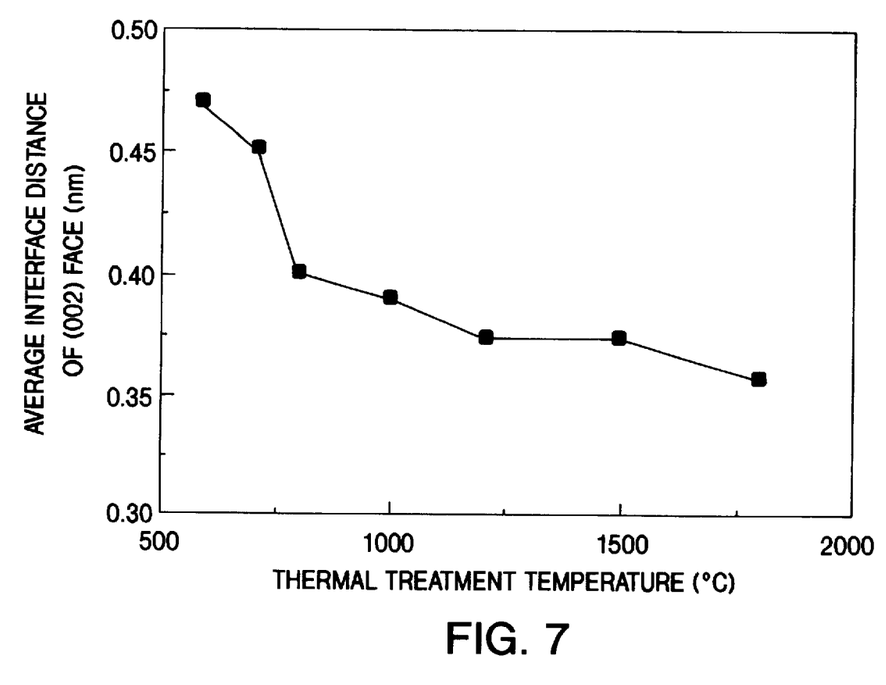
FIG. 7 is a graph showing relationship between the temperature of heat treatment and the average lattice distance of the (002) plane of the amorphous section of the obtained carbon powder for negative electrode in Example 6 of the first exemplary embodiment of the present invention.

On the contrary, the average lattice distance of the (002) plane of the section of an amorphous structure changed depending on the heat treatment temperature. FIG. 7 shows change of the average lattice distance of the (002) plane of the amorphous structure section as a function of the heat treatment temperature. From FIG. 7, it is found that the average lattice distance of the (002) plane of the amorphous structure section of the carbon material having a small irreversible capacity and a large discharge capacity as a carbon material for negative electrode and obtainable in the range of heat treatment temperature of 700° C. to 1500° C. is between 0.46 and 0.37 nm.

EXAMPLE 7

A solidified resin is obtained by first pulverizing the same composite resin as used in Example 1 to an average particle diameter of 15 μm and dispersing in an aqueous solution of a resol type phenol resin, and then curing by heating to 180° C. In doing this, the mixing of the composite resin was made at the ratio of 20 parts by weight of composite resin to 100 parts by weight of the resol type phenol resin. Carbon powders were prepared by subsequent pyrolysis, pulverization, and heat treatment of the above solidified resin under the same conditions as in Example 1.

Using the carbon powder, coin type test cells were made in the same manner as in Example 1, initial charge and initial discharge were made, and the initial discharge capacity and the irreversible capacity were obtained. A large average initial discharge capacity of 570 mAh·g$^{-1}$ and a relatively small average irreversible capacity of 100 mAh·$^{-1}$ were obtained, suggesting a characteristic sufficient as a carbon material for negative electrode of a lithium ion secondary battery.

EXAMPLE 8

Using a resol type phenol cured by adding the composite resin powders of Example 1 as the starting material as in Example 7, carbon powders were prepared by carrying out pyrolysis and pulverization under the same conditions as in Example 1, and heating the pyrolysis product powders to 600° C., 700° C., 800° C., 1000° C., 1200° C., 1500° C., and 1800° C. at a temperature rise rate of 5° C.·min$^{-1}$, followed by heat treatment by keeping each sample for 1 hour at each respective temperatures.

Figure 8:
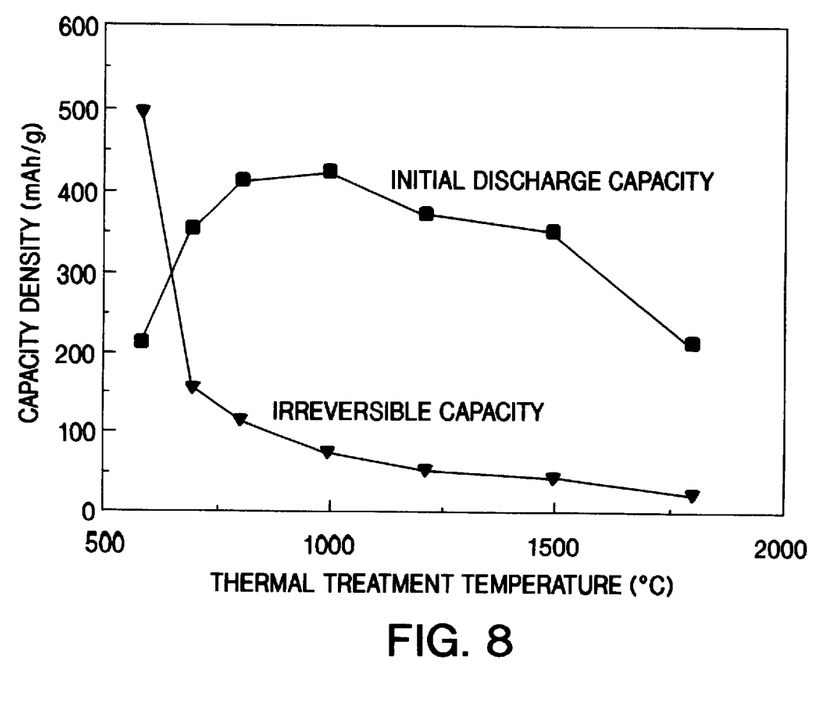
FIG. 8 is a graph showing relationship between the temperature of heat treatment and the discharge capacity and irreversible capacity of the obtained carbon material in Example 8 of the first exemplary embodiment of the present invention.

Using respective carbon powders, coin type test cells were made in the same manner as in Example 1, and the initial discharge capacity and the irreversible capacity were obtained from the initial charge and the initial discharge. FIG. 8 shows the initial discharge capacity and the irreversible capacity as a function of the heat treatment temperature. It is seen from FIG. 8 that, in the heat treatment temperature range 700° C. to 1500° C., the irreversible capacity is relatively small and the initial discharge capacity is at least 350 mAh·g$^{-1}$ suggesting that the material is appropriate as a carbon material for negative electrode of a lithium ion secondary battery.

The carbon powder prepared in accordance with the first exemplary embodiment of the present invention has an amorphous structure in the inside of the powder and a stratiform structure has been formed on at least part of the powder surface nearly in parallel to the surface by the carbon produced by pyrolysis of the pitch. It is considered that, in a carbon material having such a structure, as functional groups are not exposed on the surface of the carbon powder, a reduction in the irreversible capacity has become possible. Furthermore, it is extremely important that the thickness of the stratiform structure on the surface of the carbon powder be 50 nm or less and at the same time the average lattice distance of the (002) plane of the stratiform structure be in the range 0.335 nm to 0.38 nm. The reason is because these conditions of the stratiform structure of the carbon powder surface make insertion of Li$^+$ into the inside of the powder easy.

It is further considered that the average lattice distance of the (002) plane of the amorphous structure section inside the carbon powder being in the range 0.37 nm to 0.46 nm is the reason enabling increase of the quantity of absorption of Li and enabling the initial discharge capacity to exceed the theoretical limit of graphite of 372 mAh·g$^{-1}$.

Although the starting and ending temperatures of pyrolysis differ slightly depending on the type of the pitch-soluble resin employed, they generally fall within the range 300° C. to 550° C. and 450° C. to 700° C., respectively.

Though petroleum pitch was used as an example of the pitch in each example of the first exemplary embodiment, it has separately been confirmed that coal pitch and naphthalene pitch will also produce equivalent effect. Consequently, at least one selected from the group consisting of petroleum pitch, coal pitch, and naphthalene pitch may be used as the applicable pitch which is one of the requirements of the present invention. Also, the effective range of quantity of addition of these pitches to 100 parts by weight of pitch-soluble resin is between 1 part by weight to 50 parts by weight.

As the pitch-soluble resin into which these pitch is to be dissolved, a novolac phenol resin is preferable. It is because in the case of an aromatic polymer in which hydrogen is bonded to the para site to the substituent group, a part of the pitch reacts with the section of the para site. Consequently, when the novolac phenol resin is of high ortho type, the number of para sites bonded with hydrogen is larger making it more preferable.

As it is possible to uniformly dissolve pitch by adding various kinds of pitch to such a novolac phenol resin and stirring in a heated and molten state, preparation of composite resins is made easy.

The process of making curing treatment of a composite resin by curing a pitch-soluble resin in which pitch has been dissolved has the advantage of making handling of the composite resin easy. As a process of curing treatment of the composite resin, 2 to 20 wt % of hexamethylenetetramine and the like is added as the curing agent and heat is applied as shown in Example 5. Usual curing method for a novolac phenol resin may be applied.

By using a novolac phenol resin as a pitch-soluble resin of the composite resin of the present invention, as the degree of cross linking between phenol rings is high, the carbon material produced by pyrolysis is able to absorb a large quantity of Li reflecting the cross-linking structure of such resin, and at the same time it has the effect of suppressing increase of the irreversible capacity.

The present invention not only uses as the starting materials a composite resin obtained by dissolving pitch in a pitch-soluble resin such as a novolac phenol resin and a material obtained by curing the composite resin, it also uses a material obtained by adding the above-mentioned composite resin into an uncured resin having a phenol type hydroxyl group such as a resol type phenol resin. The resol type phenol resin having a high degree of cross linking, the carbon material produced by its pyrolysis can further increase the quantity of absorption of Li thus providing a material for an electrode which is appropriate to achieve a higher capacity.

In each of the examples of the first exemplary embodiment, description has been made on performing each of the pyrolysis, pulverization, and heat treatment processes in a non-oxidizing atmosphere comprising an inert gas such as nitrogen gas. However, the atmosphere of the pyrolysis and heat treatment process may be replaced by a vacuum of 10 torr or lower by using an equipment such as a vacuum furnace. It is especially effective to make the atmosphere of pyrolysis to a vacuum. Generally, pyrolysis of graphitizable material such as various types of pitch produces graphite group soft carbon having a high crystallization. Conversely, pyrolysis of non-graphitizable material such as phenol group resins produces amorphous or low-crystallization hard carbon. As set forth earlier, as the hard carbon has a large quantity of absorption of Li, it is attracting attention as a material to achieve a higher capacity in exceess of the theoretical capacity of 372 mAh·g$^{-1}$ of graphite. In a negative electrode employing a carbon material, though the quantity of Li absorption increases with the progress of charge, the charge potential of the negative electrode during the process shows a large variation in the case of soft carbon, whereas variation is small in the case of hard carbon. The fact that the variation of the charge potential of a negative electrode employing hard carbon is small makes it possible to attain a higher capacity of the negative electrode in a lithium-ion secondary battery in which it is charged to a fixed voltage in order to prevent over charge. However, when a mistake is made in controlling the atmosphere in the pyrolysis process, because the decomposed gas evolving during pyrolysis comes in contact with the intermediate product of pyrolysis, the capacity of the carbon material produced by pyrolysis may be reduced or dispersion of capacity may be caused owing to side reaction other than decomposition reaction. Consequently, employment of a vacuum as the pyrolysis atmosphere has the advantage of quickly exhausting the decomposed gas to outside of the system.

Furthermore, it is desirable to make the pulverizing process following pyrolysis in a non-oxidizing atmosphere. In this case, as it is difficult to pulverize in a vacuum in an industrial scale, it will be appropriate to adopt an inert gas atmosphere such as nitrogen and argon. By pulverizing the pyrolysis product in a non-oxidizing atmosphere using an inert gas, it is possible to control functional groups from being exposed on the carbon powder surface which will otherwise result in irreversible capacity which blocks from attaining a higher capacity of the battery being prepared.

Second Exemplary Embodiment

EXAMPLE 1

A reaction solution is prepared by adding 28.2 grams of phenol and 17.1 grams of paraformaldehyde into water. The reaction solution is heated to 50° C., added with lithium hydroxide (LiOH) as a catalyst to between pH 8.0 and 8.5, and then heated to 80° C. while being stirred, followed by continued stirring for 30 minutes at that temperature. Subsequently, the solution is stirred for 1 hour at 90° C., left standing until it cools to room temperature, then acetic acid is added until pH 7 is reached.

It is then filtered after pouring equivalent volume of methanol, and a solid is separated. By washing the solid in boiling methanol for 15 minutes, a resol type phenol resin is prepared, which is one type of typical phenol formaldehyde resin. The obtained phenol formaldehyde resin is heated in a polytetrafluoroethylene vessel from room temperature to 180° C. at a temperature-rise rate of 1° C.·$min^{-1}$. After keeping it at that temperature for 10 hours, it is cooled to room temperature and the phenol formaldehyde resin is cured.

The cured phenol formaldehyde resin is pulverized in a ball mill until it passes a 75-$\mu$m-mesh sieve. Powder of the cured phenol formaldehyde resin contained in an alumina vessel is introduced into a tubular electric furnace, heated to 1000° C. at a temperature-rise rate of 1° C.·$min^{-1}$ after making inside of the furnace to a vacuum of 10 torr or lower, kept for 1 hour at 1000° C., and is cooled to room temperature at a rate of 5° C.·$min^{-1}$ to prepare carbon powder Sample No. 2-1.

Also, powder of a cured phenol formaldehyde resin which has been similarly prepared and has passed a 25-$\mu$m-mesh sieve is introduced into a tubular electric furnace, and subjected to pyrolysis in a nitrogen gas flow under the same conditions as in the case of a vacuum to prepare carbon powder Sample No. 2-2.

Using the prepared carbon powder samples No. 2-1 and No. 2-2, coin type test cells were made in the same manner as Example 1 of the first exemplary embodiment and the initial discharge capacity and irreversible capacity were obtained from an initial charge and initial discharge. Subsequently, charge and discharge were repeated to study the change of the carbon electrode capacity.

EXAMPLE 2

In preparing the uncured phenol formaldehyde resin which is the resol type phenol resin in Example 1, the catalyst LiOH to be added to the reaction solution, being an aqueous solution of phenol and formaldehyde, was changed with sodium hydroxide (NaOH). Carbon powder sample was prepared by subsequently curing the resin, pulverizing, and pyrolyzing (in a vacuum) under otherwise the same conditions as in Example 1.

In the preparation of the uncured phenol formaldehyde resin, the ratios of residual NaOH in the cured phenol formaldehyde resin were made to 0.2, 1, and 5 wt % by changing the quantity of NaOH to be added as a catalyst to the reaction solution.

Carbon powder Samples No. 2-3, 2-4, and 2-5 were prepared under the conditions described above. Coin type test cells were made in the same manner as in Example 1 and the characteristic of the carbon electrode was studied.

EXAMPLE 3

While a simple phenol was used in Example 1 as the initial reaction solution to prepare an uncured phenol formaldehyde resin, an uncured resin was prepared by substituting the simple phenol with a m-cresol with other conditions the same as in Example 1. After subsequent curing and pulverization, powder of cured phenol resin is obtained. Carbon powder is prepared by mixing the cured resin powder prepared in this Example 3 and the cured phenol formaldehyde resin powder prepared in Example 1, heating to 1200° C. in a vacuum furnace with a degree of vacuum of 10 torr or lower, and subsequently pyrolyzing it by keeping at that temperature for 1 hour. The contents of the cured phenol resin of Example 3 in the mixed resin powders are made to be 0, 5, 10, 20, and 30 wt %, and the carbon powders prepared are respectively designated as Sample Nos. 2-6, 2-7, 2-8, 2-9, and 2-10.

Using each of these carbon powders, respective coin type test cells were prepared in the same manner as in Example 1 and the characteristic of the negative electrode wag studied.

EXAMPLE 4

Curing of the uncured phenol formaldehyde resin of Example 1 by heating to 180° C. was performed on a graphite sheet, in place of the polytetrafluroethylene vessel, prepared by heating and graphitizing a polyimide film. Carbon powder Sample No. 2-11 was prepared by subsequent pulverization and pyrolysis (in a vacuum) under the same conditions as in Example 1.

Also, carbon powder Sample No. 2-12 was prepared by carrying out pyrolysis in Example 1 of the cured phenol formaldehyde resin powder in a vacuum on a graphite sheet, in place of the alumina vessel, prepared by heating and graphitizing the above mentioned polyimide film.

Using these carbon powder Sample Nos. 2-11 and 2-12, coin type test cells were made in the same manner as in Example 1 and the characteristic of the carbon electrode was studied.

EXAMPLE 5

An uncured phenol formaldehyde resin is prepared in the same manner as in Example 1, cured and pulverized, and powder of cured phenol formaldehyde resin is obtained.

The above resin powder is heated to 500° C. in a nitrogen gas flow at a temperature-rise rate of 1° C.·$min^{-1}$, pyrolized by keeping at 500° C. for 1 hour, and cooled to room temperature.

Subsequently, powder of the pyrolysis product is heated to 1000° C. at a temperature-rise rate of 1° C.·$min^{-1}$ in a vacuum furnace of a degree of vacuum of 10 torr or lower, heat treated by keeping at 1000° C. for 1 hour, and carbon powder Sample No. 2-13 is obtained. Using the carbon powder, test cells were made in the same manner as in Example 1 and the characteristic of the carbon electrode was studied. Table 2 gives a summary of the negative electrode characteristics, namely, initial discharge capacity, irreversible capacity, charge-discharge efficiency at the second cycle (ratio of discharge capacity to charge capacity), and discharge capacity at the 20th cycle, of each carbon powder sample. These measured values are average of 10 each cells.

In Table 2, it is seen that the carbon materials prepared by pyrolysis of a phenol resin, being a non-graphitizable material, in an inert gas atmosphere such as nitrogen or in a vacuum have relatively small irreversible capacities and that the initial discharge capacity and the discharge capacity at the 20th cycle of all samples are in excess of the theoretical capacity, 372 mAh·g$^{-1}$.

TABLE 2

| Example No. | Sample No. | Initial Disch. Capacity (mAh · g$^{-1}$) | Irrev. Capacity (mAh · g$^{-1}$) | Charge-Disch. Efficiency at 2nd Cycle (%) | Discharge Capacity at 20th Cycle (mAh · g$^{-1}$) |
| --- | --- | --- | --- | --- | --- |
| 1 | 2-1 | 550 | 180 | 98.5 | 490 |
|   | 2-2 | 510 | 200 | 96.0 | 440 |
| 2 | 2-3 | 480 | 210 | 97.0 | 420 |
|   | 2-4 | 520 | 190 | 97.5 | 460 |
|   | 2-5 | 430 | 230 | 95.0 | 350 |
| 3 | 2-6 | 510 | 200 | 96.0 | 440 |
|   | 2-7 | 520 | 190 | 97.0 | 440 |
|   | 2-8 | 510 | 180 | 97.5 | 450 |
|   | 2-9 | 490 | 170 | 98.0 | 440 |
|   | 2-10 | 470 | 150 | 98.5 | 430 |
| 4 | 2-11 | 520 | 170 | 97.0 | 460 |
|   | 2-12 | 530 | 140 | 98.0 | 480 |
| 5 | 2-13 | 540 | 190 | 97.5 | 480 |

By comparing Samples No. 2-1 and 2-2 of the carbon powder, it can be seen that a smaller irreversible capacity is obtained in a pyrolysis atmosphere of a vacuum than in an inert gas atmosphere and that all of the negative electrode characteristics, namely, the initial discharge capacity, the charge-discharge capacity of the second cycle, and the discharge capacity of the 20th cycle are improved. Although data is not shown here, there is also advantage of smaller dispersion of characteristics with a vacuum atmosphere. As is the case with the Sample No. 2-13, the dispersion can be sufficiently improved by pyrolysis in an inert gas flow followed by heat treatment in a vacuum.

Also, it has been made clear that the LiOH catalyst used in preparing an uncured phenol formaldehyde may be replaced with NaOH and that the effect is not affected by allowing some of the catalyst to remain in the resin.

Also, it is effective in stabilizing the carbon electrode characteristics to replace the vessel for curing an uncured phenol resin and the vessel for pyrolysis of powder of a cured phenol resin in a vacuum with a graphite sheet obtained by heating and graphitizing a polyimide film. The graphite sheet can also be effectively used in the heat treatment process. As the graphite sheet used is flexible and has a high thermal conductivity of about twice that of copper, it provides an advantage of making uniform the temperature distribution in the processes of thermal curing, pyrolysis, and heat treatment. It is especially effective in improving the thermal conductivity in a vacuum.

In many of the examples of this exemplary embodiment, although description has been made on using as the starting material a resin in which the aromatic compound contained in the primary chain is a simple phenol, a resin in which part or all of the aromatic compound contained in the primary chain is either phenol or a phenol derivative may be used as an effective starting material. Also, a resin with a structure including a skeleton in which these phenol or phenol derivatives are connected by methylene groups may be an effective starting material. In this Example, a resol type phenol resin was used as a preferred material, however, it can be expected that a carbon material with a characteristic equivalent to that of resol type may be obtained even by using a nobolac phenol resin without self-cross-linking property by proper choice of a cross-linking agent.

As set forth above, though the temperature of pyrolysis differs depending on the kind of phenol type resin, a temperature no higher than 1500° C., in particular, in a range between 600° C. and 1500° C., is chosen in which the phenol resin does not usually graphitize in a vacuum or in an inert gas atmosphere.

Also, by carrying out as a first step pyrolysis in a vacuum or in an inert gas atmosphere at a maximum temperature between 500° C. and 700° C., and carrying out as a second step heat treatment in a vacuum at a maximum temperature between 700° C. and 1500° C., a carbon material having superior electrode characteristics with a low irreversible capacity, a large initial discharge capacity, and with a small capacity decrease due to charge-discharge cycles is obtained.

By employing in the negative electrode a carbon material prepared by the first and the second exemplary embodiments, a high capacity of a lithium-ion secondary battery can be achieved.

In the above exemplary embodiments, although examples of application to coin type cells have been described, there is no limitation on the applicable cell configuration. The invention may be applied to various types of configurations including cylindrical or rectangular configurations.

Also, as the liquid electrolyte of the cell, although reference has been made to one prepared by dissolving LiPF$_6$ into a mixed solvent of ethylene carbonate and diethyl carbonate, the invention may be applied to one prepared by dissolving a lithium salt such as LiBF$_4$ or LiAsF$_6$ into a mixed solvent and the like of propyl carbonate and diethyl carbonate. Furthermore, needless to say, the invention may also be applied to other lithium salts dissolved in other solvents.

Also, although description has been made for the case of use of metallic Li for the counter electrode, the counter electrode is not limited to metallic Li. The invention may be applied to Ni compounds, Mn compounds, Fe compounds, Co compounds, etc., and, moreover, other positive electrodes may be used.

What is claimed is:

1. A carbon material suitable for use in a secondary battery, comprising:
    (a) an amorphous carbon structure;
    (b) a stratiform carbon structure above said amorphous carbon structure; and
    (c) a surface portion above said stratiform carbon structure.

2. The carbon material for a secondary battery according to claim 1 wherein the stratiform structure has a thickness of 50 nm or less and in (002) plane average lattice distance of 0.335 nm to 0.38 nm.

3. The carbon material for a secondary battery according to claim 1 wherein the amorphous structure has an (002) plane average lattice distance of 0.37 nm to 0.46 nm.

4. The carbon material for a secondary battery according to claim 2 wherein the amorphous structure has an (002) plane average lattice distance of 0.37 nm to 0.46 nm.

5. A process of fabricating a carbon material for a secondary battery comprising the step of:
    (a) obtaining a composite resin by dissolving pitch in a pitch-soluble resin;
    (b) heating said composite resin at least once at a temperature between a starting temperature and an ending temperature of pyrolysis and forming a heat treated resin;

(c) pulverizing said heat treated resin and forming a pulverized heat treated resin; and (d) heating the pulverized heat treated resin at least once.

6. A method of fabricating a carbon material for a secondary battery comprising the steps of:

(a) obtaining a composite resin by dissolving pitch in a pitch-soluble resin;

(b) dispersing said composite resin in an uncured resin having phenolic hydroxyl groups and forming a dispersed resin;

(c) curing said dispersed resin and forming a cured resin; and (d) heat treating said cured resin.

7. The method according to claim 6 wherein the pitch-soluble resin is a novolac resin.

8. The method according to claim 6 wherein the uncured resin having phenolic hydroxyl groups is a resol resin.

9. A process of fabricating a carbon material for a secondary battery comprising the steps of:

(a) preparing a resin having a primary chain containing an aromatic compound; and (b) heat creating said resin in a vacuum to obtain an amorphous carbon material which can be used as an electrode of a battery.

10. A method of fabricating a carbon material for a secondary battery, said method comprising:

performing a first heat treatment of a resin in an inert gas or in a vacuum, and performing on a graphite sheet prepared by heat treating a polyimide film a second heat treatment in a vacuum at a temperature different from said first heat treatment.

11. The process according to claim 10 wherein the first heat treatment is at a temperature between a starting temperature and an ending temperature of pyrolysis and the second heat treatment is in a temperature range of 700° C. to 1500° C.

12. The process according to claim 9 wherein part or all of the aromatic compound in the primary chain is phenol or a phenol derivative.

13. The process according to claim 12 further comprising the step of pulverizing a resin which has been processed with a curing treatment.

14. The process according to claim 5 wherein said heating of the resin is performed on a graphite sheet prepared by heat treating a polyimide film.

15. The process according to claim 6 wherein said heating of the resin is performed on a graphite sheet prepared by heat treating a polyimide film.

16. The process according to claim 9 wherein said heat treating in a vacuum is performed on a graphite sheet prepared by heat treating a polyimide film.

17. The process according to claim 10 wherein said second heat treatment is performed on a graphite sheet prepared by heat treating a polyimide film.

18. A secondary battery having:

(a) an electrode comprising a carbon material, said carbon material having (i) an amorphous carbon structure, (ii) a stratiform carbon structure above said amorphous carbon structure, and (iii) a surface portion above said stratiform carbon structure;

(b) a second electrode; and (c) a liquid electrolyte between said electrodes.

19. A secondary battery having an electrode comprising a carbon material, a second electrode, and a liquid electrolyte between said electrodes, wherein said carbon material is an amorphous material obtained by heating in a vacuum a resin having a primary chain containing an aromatic compound.

20. The carbon material of claim 1 wherein said stratiform carbon structure is substantially parallel to said surface portion.

21. The secondary battery of claim 18 wherein the battery has an initial discharge capacity in excess of 372 mAh·g$^{-1}$.

22. The secondary battery of claim 18 in which the stratiform structure has a thickness of 50 nm or less and an (002) plane average distance of 0.335 to 0.38 nm; and the amorphous structure has an (002) plane average lattice distance of 0.37 to 0.46 nm.

23. The secondary battery of claim 22 wherein the battery has an initial discharge capacity in excess of 372 mAh·g$^{-1}$.

24. The secondary battery of claim 19 wherein the battery has an initial discharge capacity in excess of 372 mAh·g$^{-1}$.

25. The secondary battery of claim 19 wherein the battery has an initial discharge capacity in excess of 372 mAh·g$^{1}$.

26. A method for fabricating a carbon material for a secondary battery, the process comprising the steps of:

(a) dissolving a pitch in a pitch-soluble resin to form a composite resin, wherein:

the composite resin has a starting temperature of pyrolysis and an ending temperature of pyrolysis, the composite resin comprises 1 to 50 parts by weight of pitch per 100 parts by weight of pitch-soluble resin; and the pitch-soluble resin is a phenolic resin;

(b) heating said composite resin at a temperature between the starting temperature of pyrolysis and the ending temperature of pyrolysis and forming a heat treated resin, wherein said starting temperature of pyrolysis is within the range of 300° C. to 550° C., and said ending temperature of pyrolysis is within the range of 450° C. to 700° C.; and said heating said composite resin is carried out in a non-oxidizing atmosphere or in a vacuum of 10 torr or lower;

(c) pulverizing said heat treated resin and forming a pulverized heat treated resin; and (d) heating said pulverized heat treated resin and forming said carbon material, wherein said heating said pulverized heat treated resin is carried out in a temperature range of 700° C. to 1500° C., and said heating said pulverized heat treated resin is carried out in a non-oxidizing atmosphere or in a vacuum of 10 torr or lower.

27. The method of claim 26 wherein said pitch is at least one selected from the group consisting of petroleum pitch, coal pitch, and naphthalene pitch.

28. The method of claim 26 wherein said pitch-soluble resin comprises a novolac resin.

29. The method of claim 28 wherein said pitch is at least one selected from the group consisting of petroleum pitch, coal pitch, and naphthalene pitch.

30. The method of claim 26 additionally comprising the step of curing said pitch-soluble resin.

31. The method of claim 30 wherein said curing comprises heating said composite resin with 2 to 20 wt % of hexamethylenetetramine.

32. The method of claim 30 said pitch-soluble resin is a novolac resin.

33. The method of claim 30 said pitch-soluble resin is a resol resin.

34. The method of claim 28 wherein said heating said composite resin is carried out in the vacuum.

35. A secondary battery comprising a first electrode comprising a carbon material, a second electrode, and a liquid electrolyte between said electrodes, wherein said carbon material is prepared by the method of claim 26.

36. The secondary battery of claim 35 wherein the carbon material comprises a stratiform structure that has a thickness of 50 or less and an (002) plane average distance of 0.335 to 0.38 nm, and an amorphous structure that has an (002) plane average lattice distance of 0.37 to 0.46 nm.

37. The secondary battery of claim 36 wherein the battery has an initial discharge capacity in excess of 372 mAh·g$^{-1}$.

38. The secondary battery of claim 35 wherein the battery has an initial discharge capacity in excess of 372 mAh·g$^{-1}$.

* * * * *

UNITED STATES PATENT AND TRADEMARK OFFICE
CERTIFICATE OF CORRECTION

PATENT NO.     : 6,316,146 B1
DATED          : November 13, 2001
INVENTOR(S)    : Watanabe et al.

It is certified that error appears in the above-identified patent and that said Letters Patent is hereby corrected as shown below:

Title page,
Item [54], insert -- THEIR -- after the word "AND"

Column 14,
Line 53, claim 2, "in" should read -- an --
Line 62, claim 5, "step" should read -- steps --

Column 15,
Line 22, claim 9(b), "creating" should read -- treating --

Column 16,
Line 10, claim 22(b), "nm;" should read -- nm, --
Line 33, claim 26(b), "C.," should read -- C, --
Line 34, claim 26(b), "C." should read -- C --
Line 35, claim 26(b), "C.;" should read -- C; --
Line 43, claim 26(d), "C." should read -- C --
Line 43, claim 26(d), "C.," should read -- C, --

Signed and Sealed this

Twenty-fourth Day of December, 2002

JAMES E. ROGAN
*Director of the United States Patent and Trademark Office*